US012807154B2

(12) United States Patent
Jing et al.

(10) Patent No.: US 12,807,154 B2
(45) Date of Patent: Nov. 24, 2026

(54) METHOD, APPARATUS AND STORAGE MEDIUM FOR CONTROLLING DRIVING MODES AND OPERATIONS FOR VEHICLES

(71) Applicant: TUSIMPLE, INC., San Diego, CA (US)

(72) Inventors: Junbo Jing, San Diego, CA (US); Patrik Kolaric, San Diego, CA (US); Chunan Huang, San Diego, CA (US); Stephen W. Horton, San Diego, CA (US); Arda Kurt, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 324 days.

(21) Appl. No.: 18/464,936

(22) Filed: Sep. 11, 2023

(65) Prior Publication Data

US 2024/0101114 A1 Mar. 28, 2024

Related U.S. Application Data

(60) Provisional application No. 63/380,939, filed on Oct. 25, 2022, provisional application No. 63/376,776, filed on Sep. 22, 2022.

(51) Int. Cl.
*B60W 30/16* (2020.01)
*B60W 10/04* (2006.01)
(Continued)

(52) U.S. Cl.
CPC ............ *B60W 30/16* (2013.01); *B60W 10/04* (2013.01); *B60W 10/18* (2013.01); *B60W 30/14* (2013.01);
(Continued)

(58) Field of Classification Search
CPC ...... B60W 30/16; B60W 10/04; B60W 10/18; B60W 30/14; B60W 30/182;
(Continued)

(56) References Cited

U.S. PATENT DOCUMENTS

2015/0142287 A1* 5/2015 Dornieden ............ B60W 30/16 701/1
2017/0240186 A1 8/2017 Hatano
(Continued)

OTHER PUBLICATIONS

European Patent Office, Extended European Search Report for EP Appl. No. 23192002.6, issued Jan. 19, 2024, 9 pages.

*Primary Examiner* — Navid Z. Mehdizadeh
*Assistant Examiner* — Shelley Marie Osterhout
(74) *Attorney, Agent, or Firm* — Ashurst Perkins Coie US LLP

(57) ABSTRACT

Techniques are described for performing vehicle operation that comprises determining, by a computer located in a vehicle, a set of values of a predicted trajectory along which the vehicle is predicted to operate in a driving mode; performing a first determination that the vehicle is operable in the driving mode in response to determining that the set of values of the driving mode is within maximum and minimum values associated with another set of values of a trajectory along which the vehicle is expected to be operated; and causing, in response to the first determination, the vehicle to operate in the driving mode by sending one or more driving related instructions to a device in the vehicle to cause the device to perform cruise control related operations.

20 Claims, 5 Drawing Sheets

(51) Int. Cl.

| | |
|---|---|
| ***B60W 10/18*** | (2012.01) |
| ***B60W 30/14*** | (2006.01) |
| ***B60W 30/182*** | (2020.01) |
| ***B60W 60/00*** | (2020.01) |

(52) U.S. Cl.
CPC ...... *B60W 30/182* (2013.01); *B60W 60/0015* (2020.02); *B60W 60/0059* (2020.02); *B60W 2540/12* (2013.01); *B60W 2552/00* (2020.02); *B60W 2554/80* (2020.02)

(58) Field of Classification Search
CPC ......... B60W 60/0015; B60W 60/0059; B60W 2540/12; B60W 2552/00; B60W 2554/80; B60W 2540/10; B60W 30/143; B60W 50/0097
See application file for complete search history.

(56) References Cited

U.S. PATENT DOCUMENTS

| | | | | |
|---|---|---|---|---|
| 2017/0267238 | A1 | 9/2017 | Mimura et al. | |
| 2019/0049970 | A1* | 2/2019 | Djuric | G05D 1/0231 |
| 2020/0406911 | A1* | 12/2020 | She | B60W 30/18 |
| 2021/0129844 | A1 | 5/2021 | George et al. | |
| 2021/0262819 | A1* | 8/2021 | Yu | G01C 21/3602 |
| 2022/0126875 | A1 | 4/2022 | Hammoud | |
| 2022/0135039 | A1 | 5/2022 | Jardine | |
| 2023/0044965 | A1* | 2/2023 | Whang | B60W 50/082 |
| 2023/0047354 | A1* | 2/2023 | Wang | B60W 50/0097 |

* cited by examiner

METHOD, APPARATUS AND STORAGE MEDIUM FOR CONTROLLING DRIVING MODES AND OPERATIONS FOR VEHICLES

CROSS-REFERENCE TO RELATED APPLICATIONS

This patent application claims priority to and the benefit of U.S. Provisional Application No. 63/376,776, filed on Sep. 22, 2022, and U.S. Provisional Application No. 63/380,939, filed on Oct. 25, 2022. The aforementioned applications of which are incorporated herein by reference in their entireties.

TECHNICAL FIELD

This document relates to systems, apparatus, and methods to control driving related operations for autonomous vehicles.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

Techniques are described for controlling driving modes in an autonomous vehicle to perform driving related operations. In a first mode an indirect vehicle control operation can be performed, where an in-vehicle control computer located in the autonomous vehicle can send instructions to an adaptive cruise control (ACC) system so that the ACC system can perform certain driving related operations. In a second mode a direct vehicle control operation may be performed, where the in-vehicle control computer can directly send instructions to one or more devices (or one or more apparatus) on the autonomous vehicle to perform driving related operations. Techniques are also described for determining when to switch between the first and the second modes.

An example method of autonomous vehicle operation includes determining, by a computer located in a vehicle and for each of a first driving mode and a second driving mode, a predicted set of values of a predicted trajectory along which the vehicle is predicted to operate in a driving mode; performing a first determination that the vehicle is operable in the first driving mode in response to determining that the predicted set of values of the first driving mode is within maximum and minimum values associated with a set of values of a trajectory along which the vehicle is expected to be operated; and causing, in response to the first determination, the vehicle to operate in the first driving mode by sending one or more driving related instructions to a device in the vehicle to cause the device to perform cruise control related operations. The cruise control related operations include a transmission, in response to the one or more driving related instructions, of one or more commands by the device to one or more apparatus in the vehicle to operate in accordance with the one or more commands.

In some embodiments, for the first driving mode, a first predicted set of values of a first predicted trajectory includes a first range of predicted speeds and a second range of predicted locations along the first predicted trajectory at a confidence level, and, for the second driving mode, a second predicted set of values of a second predicted trajectory includes a third range of predicted speeds and a fourth range of predicted locations along the second predicted trajectory at the confidence level. In some embodiments, at least some values in the first predicted set of values are greater than or equal to at least some values in the second predicted set of values.

In some embodiments, the method further comprises performing a second determination that the vehicle is not operable in the first driving mode in response to determining that a first predicted set of values of the first driving mode are outside of the maximum and minimum values associated with the set of values of the trajectory along which the vehicle is expected to be operated; performing a third determination that the vehicle is operable in the second driving mode in response to determining that a second predicted set of values of the second driving mode is within the maximum and minimum values associated with the set of values of the trajectory along which the vehicle is expected to be operated; and causing, in response to the third determination, the vehicle to operate in the second driving mode by sending one or more driving related commands to the one or more apparatus in the vehicle, wherein the one or more driving related commands cause the one or more apparatus to operate in accordance with the one or more driving related commands.

In some embodiments, the sending the one or more driving related commands to the one or more apparatus include: sending an engine torque value to an engine of the vehicle, sending a throttle pedal position value to a motor associated with a throttle pedal, sending a brake pressure value to a brake system, sending an engine brake torque value to the engine, and/or sending a brake pedal position value to another motor associated with a brake pedal. In some embodiments, the causing the vehicle to operate in the second driving mode includes sending an instruction that causes the device to be disabled. In some embodiments, after the third determination and before the causing the vehicle to operate in the second driving mode, the method further comprises: determining that the vehicle has not previously switched from the second driving mode to the first driving mode within a pre-determined time window from a time when the third determination is performed, where the vehicle is caused to operate in the second driving mode in response to the third determination and response to the determining that the vehicle has not previously switched from the second driving mode to the first driving mode within the pre-determined time window.

In some embodiments, the set of values of the trajectory includes speeds and locations along the trajectory that includes a future time value. In some embodiments, the one or more driving related instructions sent to the device includes any one or more of: a maximum speed of the vehicle, a minimum speed of the vehicle, a maximum distance between the vehicle and a second vehicle located in front of the vehicle, a minimum distance between the vehicle and the second vehicle located in front of the vehicle, and/or an acceleration, a speed, and/or the minimum distance at one or more points in the trajectory along which the vehicle is expected to be driven. In some embodiments, the one or more apparatus include an engine, a brake system, a first motor associated with a throttle pedal, or a second motor associated with a brake pedal.

In some embodiments, the vehicle is caused to operate in the first driving mode in response to the first determination and in response to a reception of a message from the device that indicates that the device is operable. In some embodiments, for each of the first driving mode and the second driving mode, the predicted set of values of the predicted trajectory is determined based on a confidence value that indicates a likelihood that a value falls within a range of values. In some embodiments, in response to determining that a second predicted set of values of the second driving mode are outside of the maximum and minimum values associated with the set of values of the trajectory along which the vehicle is expected to be operated, the method further comprises: determining that the vehicle is operable in the second driving mode by sending one or more driving related commands to the one or more apparatus in the vehicle, wherein the one or more driving related commands cause the one or more apparatus to operate in accordance with the one or more driving related commands; reducing the confidence value to a second confidence value; determining, for each of the first driving mode and the second driving mode and based on the second confidence value, another predicted set of values of another predicted trajectory along which the vehicle is predicted to operate in the driving mode; causing the vehicle to operate in the first driving mode in response to determining that the another predicted set of values of the first driving mode is within the maximum and minimum values associated with another set of values of another trajectory along which the vehicle is expected to be operated.

In some embodiments, the set of values of the trajectory includes at least some values that are same as the another set of values of the another trajectory. In some embodiments, the sending the one or more driving related commands to the one or more apparatus include sending a brake pedal position value to another motor associated with a brake pedal. In some embodiments, the one or more driving related instructions sent to the device includes, for each of one or more points in the trajectory along which the vehicle is expected to be driven, an acceleration, a speed, and the minimum distance between the vehicle and the second vehicle located in front of the vehicle. In some embodiments, the one or more driving related instructions sent to the device includes a minimum speed of the vehicle. In some embodiments, the one or more driving related instructions sent to the device includes a maximum distance between the vehicle and a second vehicle located in front of the vehicle.

In some embodiments, after the first determination and before the causing the vehicle to operate in the first driving mode, the method further comprises: determining whether a condition associated with operating the vehicle in the first driving mode is satisfied, wherein the causing the vehicle to operate in the first driving mode is performed in response to the first determination and in response to a determination that the condition is satisfied. In some embodiments, the condition for operating the vehicle in the first driving mode is determined to be satisfied in response to determining that a risk level associated with operating the vehicle at a location is same as or less than a pre-determined risk level associated with operating the vehicle in the first driving mode.

In some embodiments, the condition for operating the vehicle in the first driving mode is determined not to be satisfied in response to determining that a risk level associated with an environment where the vehicle is operating is greater than a pre-determined risk level associated with operating the vehicle in the first driving mode, and, in response to determining that the condition is not satisfied, the vehicle is caused to operate in the second driving mode by sending one or more driving related commands to the one or more apparatus in the vehicle, wherein the one or more driving related commands cause the one or more apparatus to operate in accordance with the one or more driving related commands. In some embodiments, the method further comprises determining the risk level of the environment is high by determining that a number of vehicles located around the vehicle is greater than a pre-determined threshold value or by determining that the vehicle is driving towards a traffic intersection comprising a traffic stop slight or a traffic light.

An example method of vehicle operation includes determining, by a computer located in a vehicle, a set of values of a predicted trajectory along which the vehicle is predicted to operate in a driving mode; performing a first determination that the vehicle is operable in the driving mode in response to determining that the set of values of the driving mode is within maximum and minimum values associated with another set of values of a trajectory along which the vehicle is expected to be operated; and causing, in response to the first determination, the vehicle to operate in the driving mode by sending one or more driving related instructions to a device in the vehicle to cause the device to perform cruise control related operations.

In some embodiments, for the driving mode, the set of values of the predicted trajectory includes a first range of predicted speeds and a second range of predicted locations along the predicted trajectory at a confidence level. In some embodiments, the method further comprises performing a second determination that the vehicle is not operable in the driving mode in response to determining that the set of values of the driving mode are outside of the maximum and minimum values associated with the another set of values of the trajectory along which the vehicle is expected to be operated. In some embodiments, the vehicle is caused to operate in the driving mode in response to the first determination and in response to receiving a message from the device that indicates that the device is operable.

In some embodiments, the cruise control related operations include a transmission, in response to the one or more driving related instructions, of one or more commands by the device to one or more apparatus in the vehicle to operate in accordance with the one or more commands. In some embodiments, the one or more apparatus include an engine, a brake system, a first motor associated with a throttle pedal, or a second motor associated with a brake pedal. In some embodiments, the another set of values of the trajectory includes speeds and locations along the trajectory that includes a future time value. In some embodiments, the one or more driving related instructions sent to the device includes a maximum speed of the vehicle. In some embodiments, the one or more driving related instructions sent to the device includes, for each of one or more points in the trajectory along which the vehicle is expected to be driven, an acceleration, a speed, and a minimum distance between the vehicle and a second vehicle located in front of the vehicle.

In some embodiments, the one or more driving related instructions sent to the device includes a minimum speed of the vehicle. In some embodiments, the one or more driving related instructions sent to the device includes a maximum distance between the vehicle and a second vehicle located in front of the vehicle. In some embodiments, the vehicle is caused to operate in the driving mode in response to the first determination and in response to a reception of a message from the device that indicates that the device is operable. In some embodiments, for the driving mode, the set of values of the predicted trajectory is determined based on a confidence value that indicates a likelihood that a value falls within a range of values. In some embodiments, after the first determination and before the causing the vehicle to operate in the driving mode, the method further comprises: determining whether a condition associated with operating the vehicle in the driving mode is satisfied, wherein the causing the vehicle to operate in the driving mode is performed in response to the first determination and in response to a determination that the condition is satisfied.

In some embodiments, the condition for operating the vehicle in the driving mode is determined to be satisfied in response to determining that a risk level associated with operating the vehicle at a location is same as or less than a pre-determined risk level associated with operating the vehicle in the driving mode. In some embodiments, the condition for operating the vehicle in the driving mode is determined not to be satisfied in response to determining that a risk level associated with an environment where the vehicle is operating is greater than a pre-determined risk level associated with operating the vehicle in the driving mode. In some embodiments, the method further comprises determining the risk level of the environment is high by determining that a number of vehicles located around the vehicle is greater than a pre-determined threshold value or by determining that the vehicle is driving towards a traffic intersection comprising a traffic stop slight or a traffic light. In some embodiments, the one or more driving related instructions sent to the device includes a minimum distance between the vehicle and a second vehicle located in front of the vehicle.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
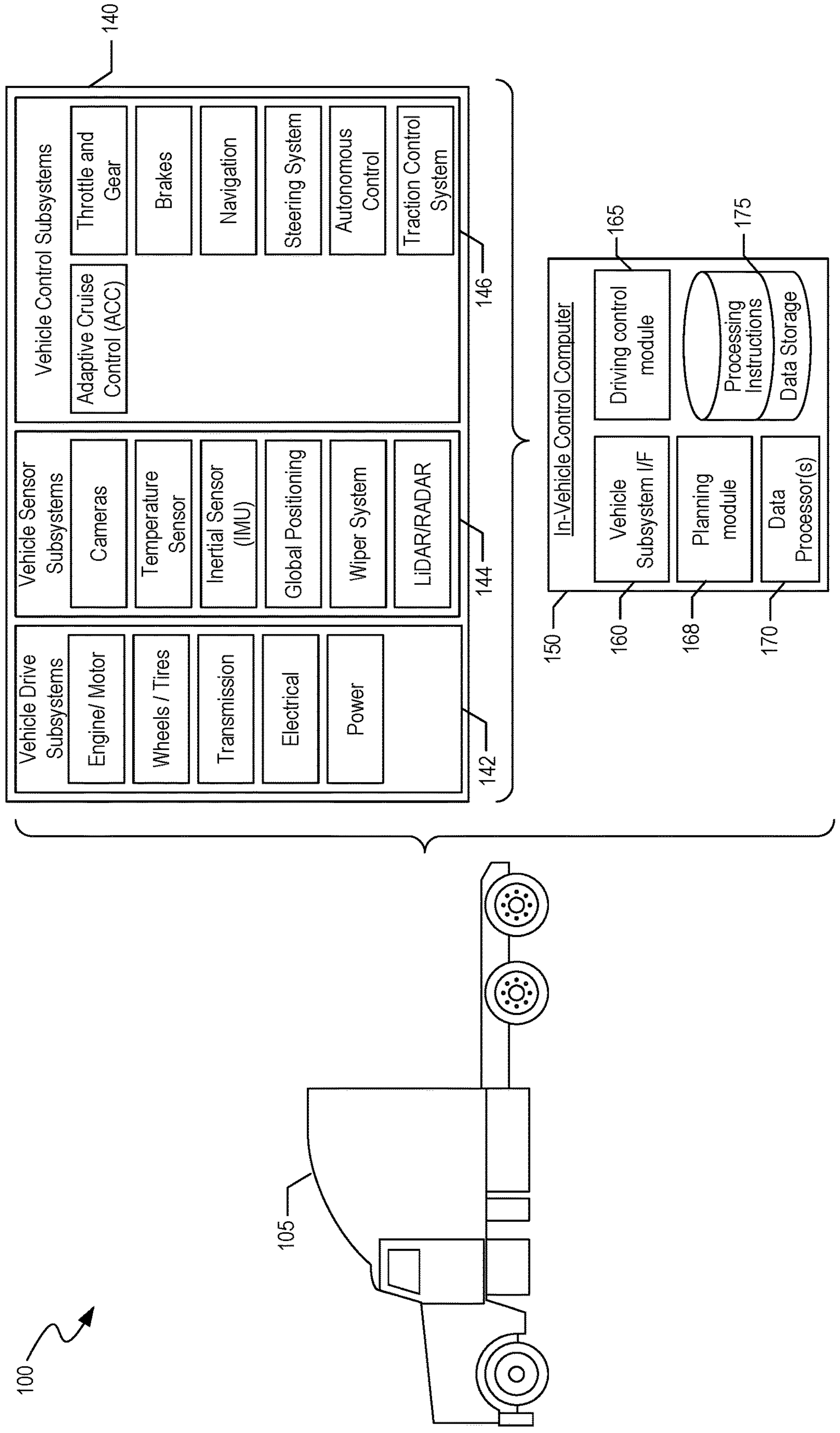
FIG. 1 shows a block diagram of an example vehicle ecosystem in which one or more driving modes and operations can be controlled in a vehicle.

When an adaptive cruise control (ACC) system is enabled in a vehicle, the ACC system can improve fuel economy on a vehicle by perform driving related operations such as cylinder shut down, neutral coasting, dynamical torque mode, etc., The ACC system can send/receive commands such as acceleration of the vehicle, speed of the vehicle, and/or distance between the vehicle and another vehicle in front of the vehicle. However, when an ACC system is integrated with a vehicle having autonomous driving technology, the ACC system can lack the kind of driving accuracy or performance that can be provided by or required from autonomous driving technology. The driving accuracy of performance of the ACC system can be quantified by errors of acceleration, speed, and/or distance (e.g., by determining a difference between actual and planned/expected acceleration, speed, and/or distance). In certain autonomous driving modes (e.g., in L4 autonomous driving where a human driver may not be available as a safety backup in an autonomous vehicle), the driving accuracy or performance can be high due to the safety requirements for performing autonomous driving operations while managing traffic interactions. While current autonomous driving technology includes hardware and software that can provide driving accuracy or performance with tighter error variance to meet the safety requirements, such hardware and software may not provide the kind of fuel economy performance that can be provided by the ACC system.

To address at least these technical issues with existing ACC systems, this patent document describes techniques to integrate autonomous driving technology with ACC system by controlling driving modes in an autonomous vehicle. For example, the autonomous vehicle can operate in a first autonomous mode where the ACC system is enabled to realize the benefits of the ACC system (e.g., fuel economy savings), and the autonomous vehicle can operate in a second autonomous mode where the ACC system can be disabled and the autonomous vehicle is operated in the second autonomous mode to provide better driving related accuracy for the autonomous vehicle. In this patent document, the terms first autonomous mode and second autonomous modes can also be respectively referred to as first driving mode and second driving mode.

When an ACC system is enabled (e.g., by a driving pressing a button related to ACC system or through an electronic command from the in-vehicle control computer in an autonomous vehicle), a driving control module (shown as 165 in FIG. 1) in an in-vehicle control computer in an autonomous vehicle can operate the autonomous vehicle in the first autonomous mode where indirect vehicle control operations can be performed. The driving control module can perform an indirect vehicle control operation by sending acceleration, speed, and/or minimum distance related command(s) to the ACC system. The ACC system can send commands to the engine or brake system (e.g., to accelerate/decelerate, or to apply brakes/amount of braking to apply) so that a distance between the autonomous vehicle and another vehicle in front of and in the same lane as the autonomous vehicle can be greater than or equal to the minimum distance value indicated in a command sent to the ACC while keeping a speed of the vehicle less than or equal to a maximum speed. The driving control module can send commands to the controller (or microcontroller) of the ACC system using an interface (e.g., an application programming interface (API)).

When the ACC system is disabled (e.g., by the driver pressing the button related to the ACC system or by the driving control module), the driving control module can operate in the second autonomous mode where direct vehicle control operations can be performed and where driving accuracy along a trajectory is prioritized. A direct vehicle control operation may include the in-vehicle control computer directly sending instructions to one or more devices on the autonomous vehicle. For example, the driving control module can send engine torque to an engine, send throttle pedal position to a motor associated with an acceleration/throttle pedal, send brake pressure values to a brake system, send engine brake torque to the engine, and/or send brake pedal position to a motor associated with a brake pedal.

In addition to performing indirect and direct vehicle control operations in the first and second autonomous modes, the driving control operation can also perform (1) motion boundary and safety risk communication with a planning module (as shown in 168 in FIG. 1); (2) motion error uncertainty online prediction for operating the autonomous vehicle in one of the two autonomous modes; and (3) switching between the two autonomous modes to control the autonomous vehicle based on one or more constraints that can be set by a determination of safety while driving the autonomous vehicle, fuel economy of the autonomous vehicle, and/or some other criteria. Motion boundary may refer to a set of minimum and maximum vehicle speed & position (or location) permissible at each future time step, given a finite length of time horizon, assessed by a planning module based on the planning module's predictive interaction evaluation with traffic vehicles, traffic rules, road geography, etc., to provide safely operate the autonomous vehicle while executing a driving mission.

In Section I, this patent document first describes a system in which multiple driving modes can be controlled in an autonomous vehicle. In Section II, this patent document describes techniques for operating in a first autonomous mode related to ACC system, a second autonomous mode related to autonomous driving technology, and for switching between the two autonomous modes. In this patent document, the term "ACC system" refers to application example where a computer located within a vehicle may interact with a motion controller in the vehicle through an interface command that may include acceleration, speed, and/or position values. The term "ACC system" may also be referred to as a "speed-distance interface" that may include an API with a motion controller.

I. Introduction

FIG. 1 shows a block diagram of an example vehicle ecosystem 100 in which one or more driving modes and operations can be controlled in a vehicle 105. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices (e.g., LiDAR shown in FIG. 1) can be removed. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the vehicle 105. The vehicle sensor subsystem 144 may include one or more cameras or image capture devices, one or more temperature sensors, an inertial measurement unit (IMU), a Global Positioning System (GPS) transceiver, a laser range finder/LiDAR unit, and/or a RADAR unit. The vehicle sensor subsystem 144 may also include sensors configured to monitor internal systems of the vehicle 105 (e.g., an $O_2$ monitor, a fuel gauge, an engine oil temperature, etc.).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LiDAR unit may be any sensor configured to sense objects in the environment in which the vehicle 105 is located using lasers. The cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a navigation unit, a steering system an autonomous control unit, traction control system (TCS) and/or adaptive cruise control (ACC) system. The throttle may be configured to control, for instance, the operating torque of the engine and, in turn, control the speed of the vehicle 105. The gear may be configured to control the gear selection of the transmission. The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

The planning module may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LiDAR, the cameras, and/or other vehicle subsystems to determine the driving path or trajectory for the vehicle 105. In some embodiments, the autonomous control unit may be a compute unit that includes one or more graphic processor units (GPUs) or one or more processors that can perform driving related operations (e.g., by sending steering, acceleration, braking commands) to one or more devices in the vehicle 105 to operate the vehicle 105 along a trajectory. The autonomous control unit can send direct vehicle control command to one or more devices in the vehicle 105 to cause the vehicle 105 to move along a trajectory at a confidence level.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

The Adaptive Cruise Control (ACC) system may include a controller (e.g., microcontroller) that can receive adjustable information such as a maximum speed of the vehicle 105 and/or desired minimum distance between the vehicle 105 and another vehicle located in front of and in the same lane as the vehicle 105 and/or desired. With the collision avoidance functionality being handled by the autonomous system, the interaction could be redefined in the combinations of maximum and minimum speed that the vehicle 105 should comply with at a current or future time stamp, and/or maximum and minimum future relative distance (e.g., distance between the vehicle 105 and another vehicle/object in front to the vehicle) that the vehicle 105 should reach at a future time stamp, and/or the desired acceleration or speed that the vehicle 105 should generate with minimal error at a current or future time stamp. The controller of the ACC system can cause the vehicle 105 to accelerate/decelerate by sending send commands (e.g., throttle pedal position or torque) to the engine or by sending commands (e.g., brake pedal position or brake pressure or brake torque) to the brake unit so that a distance between the vehicle 105 and another vehicle in front of and in the same lane as the vehicle 105 can be greater than or equal to the minimum distance value while keeping a speed of the vehicle less than or equal to a maximum speed, or by having the vehicle 105 comply with the a commanded maximum & minimum speed, and/or a commanded maximum & minimum future relative distance, and/or the commanded acceleration or speed with minimal error at a current time stamp.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the vehicle 105 in a distributed fashion. In some embodiments, the data storage device 175 may contain processing instructions (e.g., program logic) executable by the data processor 170 to perform various methods and/or functions of the vehicle 105, including those described for the driving control module 165 and the planning module 168 as explained in this patent document. For instance, the data processor 170 executes the operations associated with driving control module 165 for operating the vehicle 105 in a first autonomous mode related to ACC system or a second autonomous mode related to performing autonomous driving operations (e.g., using autonomous control unit and/or sensors described in FIG. 1). And, the data processor 170 can also execute the operations associated with planning module 168 as further described in this patent document.

The data storage device 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a data storage device 175. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

Figure 2:
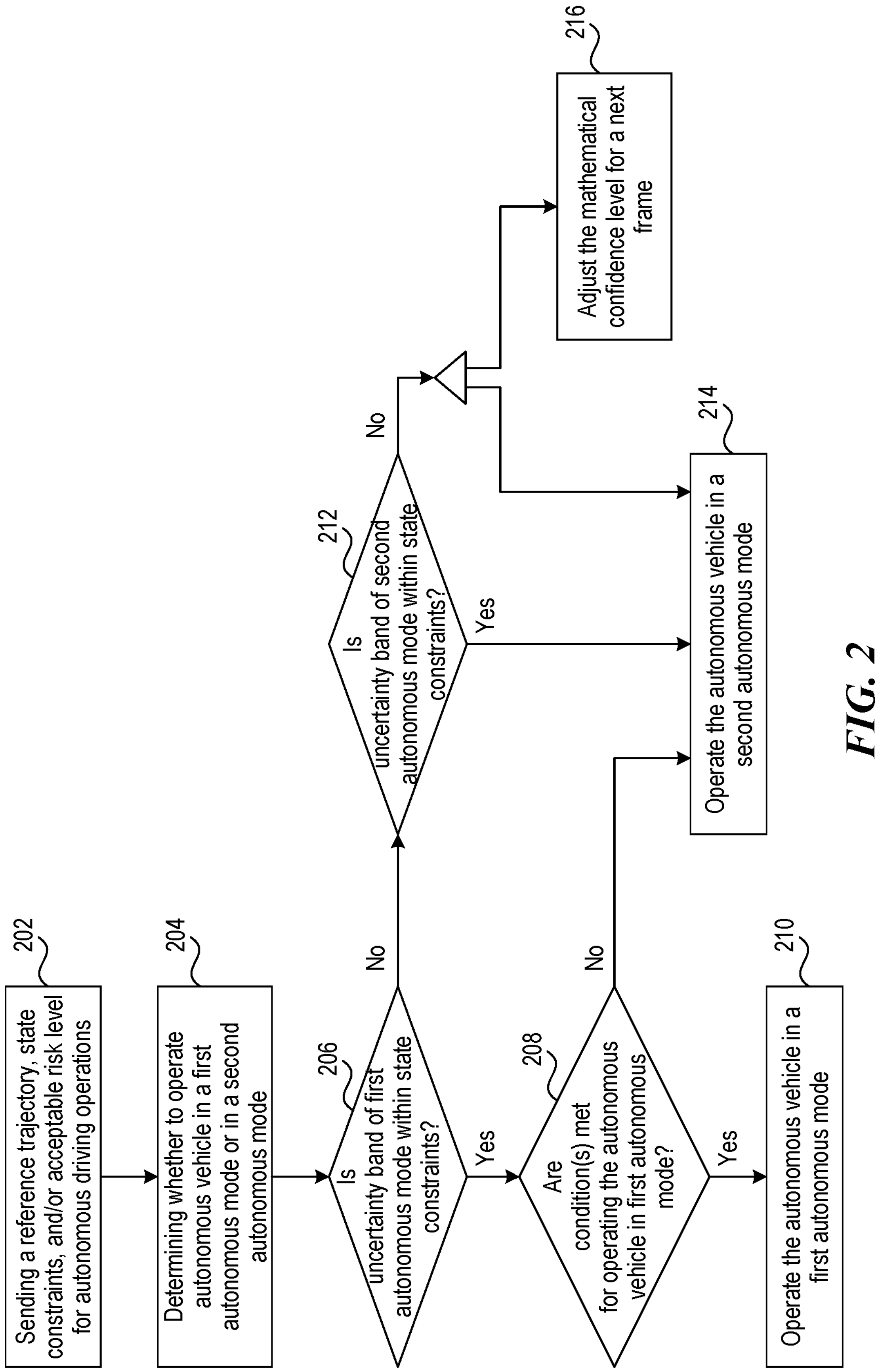
FIG. 2 shows an example flowchart for controlling driving modes in an autonomous vehicle.

II. Exemplary Techniques to Controlling Driving Modes and Operating an Autonomous Vehicle in a Driving Mode FIG. 2 shows an example flowchart for controlling driving modes in an autonomous vehicle. At operation 202, the planning module (shown as 168 in FIG. 1) sends a reference trajectory, state constraints, and/or scenario risk level for autonomous driving operations to the driving control module (shown as 165 in FIG. 1) for determining whether to operate the autonomous vehicle in a first autonomous mode or in a second autonomous mode as further explained below.

The reference trajectory may include locations of a set of points along a road where the autonomous vehicle is expected to be driven. The state constraints may include minimum and maximum vehicle speed and/or minimum and maximum location at each of the set of points that describes the reference trajectory. The state constraints may include rules or priorities that can be followed when autonomous driving operations are performed. For example, the state constraints can indicate "avoid collision" that indicates that a collision is to be avoided, or "avoid over-speeding" that indicates that the autonomous vehicle cannot exceed a pre-determined or configured maximum speed, or "follow local traffic rules" that indicate that the autonomous vehicle is to follow local speed limits and/or traffic rules that may be indicated by traffic signs. The scenario risk level information indicates level of risk that the autonomous vehicle can take while performing autonomous driving operations. The level of risk can be determined by the planning module based on a presence or absence of a driving scenario as further explained below.

At operation 204, the driving control module can determine whether to operate the autonomous vehicle in the first autonomous mode where the ACC system is enabled, or in the second autonomous mode where direct instructions are provided to one or more devices in the autonomous vehicle to improve driving accuracy along the trajectory and where the ACC system may be disabled. At operation 204, the driving control module can read instantaneous condition information (e.g., vehicle speed, acceleration demand, road grade, towing load, gear, actuation system (throttle or brake process), etc.) that have been previously identified that can affect the future control error uncertainty distributions, and then perform the uncertainty propagation prediction using, for example, machine learning techniques that have been trained offline. The driving control module can perform the uncertainty propagation prediction for both the first autonomous mode and the second autonomous mode to determine, at a confidence level and for each of the two autonomous modes, an extent to which the autonomous vehicle's speed and/or location can vary relative to expected speed and/or location associated with the set of points of the reference trajectory. Thus, for example, the driving control module can perform the uncertainty propagation prediction for both the first autonomous mode and the second autonomous mode to determine, at a confidence level and for each of the two autonomous modes, a range of values associated with speed and/or location of the autonomous vehicle. The confidence level may be a confidence value that indicates a likelihood that a value falls within a range of values. In one example, a machine learning model can be trained based on historical performance data so that the instantaneous conditions onboard the vehicle can be fed to the machine learning model for online uncertainty propagation prediction.

For both the autonomous modes, the extent to which the autonomous vehicle's speed and/or location can vary relative to expected speed and/or location associated with the set of points of the reference trajectory can be referred to as uncertainty band. For each of the two autonomous modes, uncertainty bands can describe, for the set of points of the reference trajectory, a first set of values greater or equal to than the speed and/or location values of the set of points, and a second set of values less than or equal to the speed and/or location values of the set of points at a confidence level so that at least some of the first and the second set of values can graphically located above and below the speed and/or location values associated with the set of points at equal to or above a probability rating. In most cases, the uncertainty band of the second autonomous mode can be narrower or tighter than that of the first autonomous mode, which indicates that the error between an actual driving operation related to speed and/or position and the reference trajectory can be less for the second autonomous mode than in the first autonomous mode at least because the driving related accuracy of the second autonomous mode can be better than that of the ACC system.

The driving control module can perform the uncertainty propagation prediction processes for determining whether to operate the autonomous vehicle in a first autonomous mode (which can focus on improving fuel economy) or to operate the autonomous vehicle in a second autonomous mode (that can focus on improving driving accuracy along the trajectory) where instructions are directly sent to one or more devices in the autonomous vehicle. At operation 206, if the driving control module determines that the first autonomous mode's uncertainty band is within the minimum and maximum vehicle speed and/or minimum and maximum location indicated by the state constraints for the set of points of the reference trajectory, then the driving control module can determine that an accuracy performance of the first autonomous mode can meet a safety risk requirements at a scenario and/or that the autonomous vehicle is allowed to or enabled to operate in the first autonomous mode.

At operation 208, if the driving control module determines that one or more conditions to operate the autonomous vehicle in the first autonomous mode are also met, then the driving control module can operate the autonomous vehicle in the first autonomous mode at operation 210 (e.g., by enabling the ACC system in the first autonomous mode). The one or more conditions can be indicated by state constraints and/or scenario risk level indication. In a first example, if the planning module receives location information (e.g., via a GPS device) and determines that the autonomous vehicle is driving/operating on a highway, then the planning module can determine that the scenario risk level is low or medium. A pre-determined table stored in the in-vehicle control computer can indicate that the first autonomous mode is enabled for low and medium level of risk, and that the second autonomous mode is enabled for low, medium, and high level of risk. In this first example, when the driving control module receives the scenario risk level indicating a low or medium risk level from the planning module at operation 202, then at operation 208, the driving control module can determine that the autonomous vehicle is allowed to operate in the first autonomous mode based on the information in the pre-determined table indicating that first autonomous mode is enabled for low level of risk. Thus, in this first example, the driving control module can proceed to operation 210 where the driving control module can operate the autonomous vehicle in the first autonomous mode.

In the first autonomous mode, the driving control module can send instruction(s) to a controller associated with ACC system, where the instruction (s) can include: (1) a maximum speed of the autonomous vehicle; (2) desired minimum distance between the autonomous vehicle and another vehicle located in front of and in the same lane as the autonomous vehicle; (3) an acceleration, a speed, and/or a desired minimum distance at a next point in the reference trajectory along which the autonomous vehicle will travel next; (4) an acceleration, a speed, and/or a desired minimum distance at one or more future point in the reference trajectory along which the autonomous vehicle will travel; (5) a maximum and minimum speed that the autonomous vehicle should comply with at a current or future time stamp; (6) a maximum and minimum future relative distance that the autonomous vehicle should reach at a future time stamp, and/or (7) the desired acceleration or speed that the autonomous vehicle should generate with minimal error at a current or future time stamp. When the ACC system receives instructions, a controller in the ACC system can send instructions to the engine and/or brake pedal motor that can cause the vehicle to accelerate or decelerate. The controller of ACC system may be referred to as a powertrain control module or a body control module.

In a second example, if the planning module receives image(s) provided camera(s) on the autonomous vehicle and determines that (1) the number of vehicles located around the autonomous vehicle is greater than a threshold number, and/or (2) the autonomous vehicle is driving towards a traffic intersection with a traffic stop sign/traffic light, then the planning module can determine that the scenario risk level is high. In this second example, when the driving control module receives the scenario risk level indicating a high risk level from the planning module at operation 202, then at operation 208 the driving control module can determine that the autonomous vehicle not allowed to operate in the first autonomous mode based on the information in the pre-determined table indicating that first autonomous mode is not enabled for high level of risk. Thus, in this second example, the driving control module can proceed to operation 214 where the driving control module can operate the autonomous vehicle in the second autonomous mode as further explained below.

In a third example, if the driving control module determines at operation 208 that the ACC system has previously provided a message that indicates that the ACC system is ready to operate (or operable) and/or the autonomous vehicle has not recently switched from the ACC system to the second autonomous mode, then the driving control module can operate the autonomous vehicle in the first autonomous mode at operation 210.

At operation 206, if the driving control module determines that the first autonomous mode's uncertainty band is not within the minimum and maximum vehicle speed and/or minimum and maximum location indicated by the state constraints for the set of points of the reference trajectory at the required confidence level by the planning module, then the driving control module can perform operation 212 where the driving control module can determine whether the second autonomous mode's uncertainty band is within the minimum and maximum vehicle speed and/or minimum and maximum location at the required confidence level by planning module. At operation 212, if the driving control module determines that the second autonomous mode's uncertainty band is within the minimum and maximum vehicle speed and/or minimum and maximum location, then the driving control module can proceed to operation 214 where the driving control module can operate the autonomous vehicle in the second autonomous mode.

At operation 214, the driving control module can operate the autonomous vehicle in a second autonomous mode where the driving control module or the autonomous control unit can directly send instructions or commands to one or more devices in the autonomous vehicle to perform driving related operations. For example, the driving control module or autonomous control unit may send engine torque value to an engine, send throttle pedal position value to a motor associated with an acceleration/throttle pedal, send brake pressure value(s) to a brake system, send engine brake torque value to the engine, and/or send brake pedal position value to a motor associated with a brake pedal. When the engine, brake system, throttle/brake pedal motor, receive the command, the engine, brake system, throttle/brake pedal motor can operate in accordance with the command. For example, the engine can increase fuel intake in response to receiving an engine torque value that is higher than a current torque generated by the engine, or the motor associated with the brake pedal can cause the brake pedal to be depressed in accordance with a brake pedal position value.

At operation 212, if the driving control module determines that the second autonomous mode's uncertainty band is not within the minimum and maximum vehicle speed and/or minimum and maximum location, then the driving control module can continue to operate the autonomous vehicle in the second autonomous mode at operation 214 and can alert the planning module to adjust or reduce the confidence level in the next frame at operation at operation 216, or to change the mission decision at operation 216. At operation 216, the planning module can adjust or reduce the confidence level to a new confidence level, or change the mission decision at operation 216.

The next frame can include a new set of points of the reference trajectory that may include at least some new points (new speed and/or location values) compared to the set of points with which the driving control module performs at least some of the operations described in FIG. 2. The driving control module can perform the uncertainty propagation prediction for the first and second autonomous modes to determine, at the new confidence level and for each of the two autonomous modes, an extent to which the autonomous vehicle's speed and/or location can vary relative to expected speed and/or location associated with the new set of points of the reference trajectory. By adjusting or reducing the confidence level to the new confidence level, the uncertainty band of the first and/or the second autonomous modes can be within the minimum and maximum vehicle speed and/or minimum and maximum location indicated by the state constraints.

In some embodiments, when the driving control module reduces the confidence level to the new confidence level at operation 216, the driving control module can increase the scenario risk level (e.g., from low to medium or from medium to high). A technical benefit of changing the scenario risk level is that the autonomous vehicle can be operated in the second autonomous mode more likely than in the first autonomous mode so that driving accuracy can be improved or provided.

The technique described in this patent document can allow an autonomous vehicle to improve fuel economy performance through existing fuel saving features that can be realized with the operation of an ACC system in the autonomous vehicle and to enable the autonomous vehicle to more accurately be driven along a trajectory by directly sending instructions to one or more devices in the autonomous vehicle with can be without the ACC system. By enabling a switch between the two autonomous modes described in this patent document, the autonomous vehicle can improve fuel economy using ACC system in a first autonomous mode which can be performed without compromising safety, and the autonomous vehicle can provide a more accurate driving operation in a second autonomous mode to provide a robust and safe autonomous driving technology.

In some embodiments, the driving control module can disallow the autonomous vehicle to constantly switch between the first autonomous mode and a second autonomous mode. For example, if the autonomous vehicle is operated in the first autonomous mode, and if the driving control module determines that the autonomous vehicle can be operated in the second autonomous mode (e.g., the "no" at operation 208 or the "yes" at operation 212), then the driving control module can perform a hysteresis operation before operation 212. At the hysteresis operation, if the driving control module determines (e.g., using a stored log) that the autonomous vehicle has not previously switched from the second autonomous mode to the first autonomous mode within a pre-determined time window (e.g., within the last 3 or 5 seconds) from a time when the driving control module determines that the autonomous vehicle can be operated in the second autonomous mode (at operation 212), then the driving control module can proceed to operation 214 to operate the autonomous vehicle in a second autonomous mode. At the hysteresis operation, if the driving control module determines that the autonomous vehicle has previously switched from the second autonomous mode to the first autonomous mode within the pre-determined time window from the current time, then the driving control module can operate the autonomous vehicle in a first autonomous mode.

Figure 3:
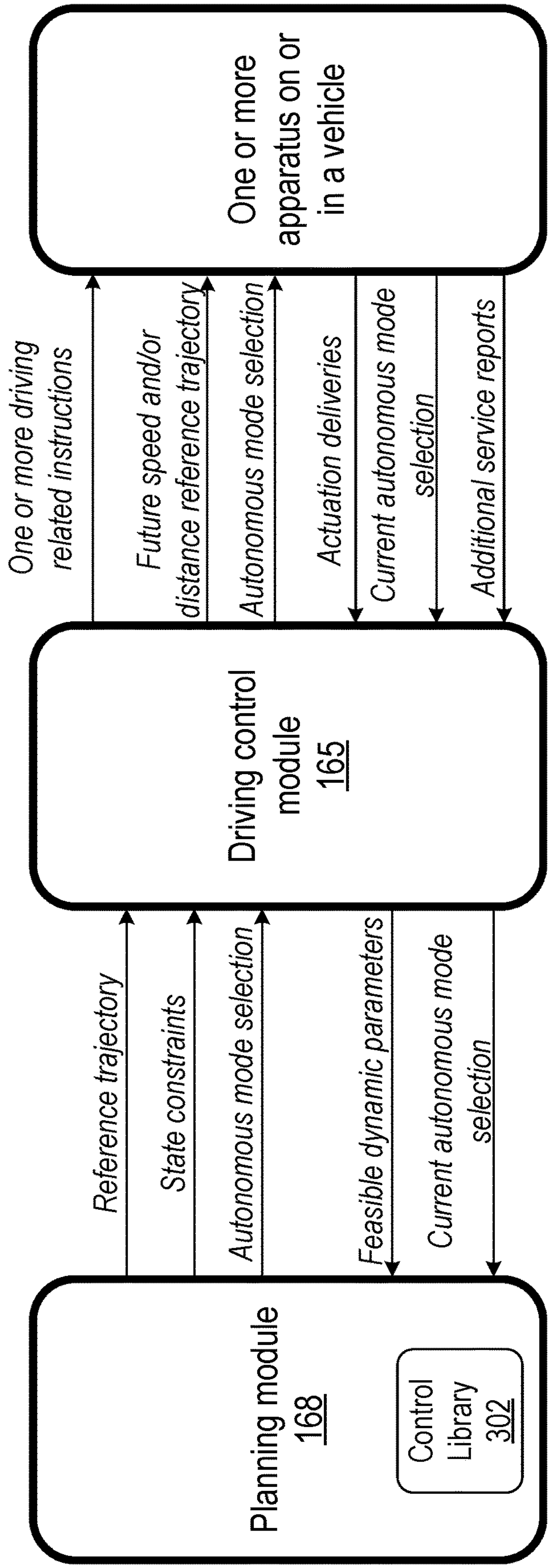
FIG. 3 shows a block diagram of an example interaction between the planning module, the driving control module, and one or more apparatus in the vehicle.

FIG. 3 shows a block diagram of an example interaction between the planning module, the driving control module, and one or more apparatus in the vehicle. The planning module 168 may include a control library 302 that is library that can characterize the autonomous vehicle's future control response for the planning module to assess driving missions' reachability & costs.

The top left of FIG. 3 shows that the planning module 168 can send to the driving control module 165 information such as a reference trajectory, state constraints, and/or autonomous mode selection. Information related to the reference trajectory and state constraints is described above in FIG. 2. The autonomous mode selection may include a message indicating that the autonomous vehicle is expected to operate in a first autonomous mode or a second autonomous mode.

The top right of FIG. 3 shows that the driving control module 165 can send information such as one or more driving related instructions (e.g., throttle, brake, steering commands), a future speed and/or distance reference trajectory with a range for permissible vehicle movement within the range, and/or the autonomous mode selection.

The bottom right of FIG. 3 shows that one or more devices in the autonomous vehicle can send actuation deliveries that may indicate status of the one or more devices (e.g., actual torque generated by engine, position of a throttle/brake pedal, etc.). The one or more devices may also indicate a current autonomous mode selection provided by the one or more devices to the driving control module 165. The one or more devices may provide additional service reports (e.g., health of a device (e.g., operational or non-operational)) to the driving control module 165.

The bottom left of FIG. 3 shows that the driving control module 165 may send to the planning module 168 information such as feasible dynamic parameters (e.g., an adjusted confidence level in operation 216 in FIG. 2) and/or current autonomous mode selection.

Figure 4:
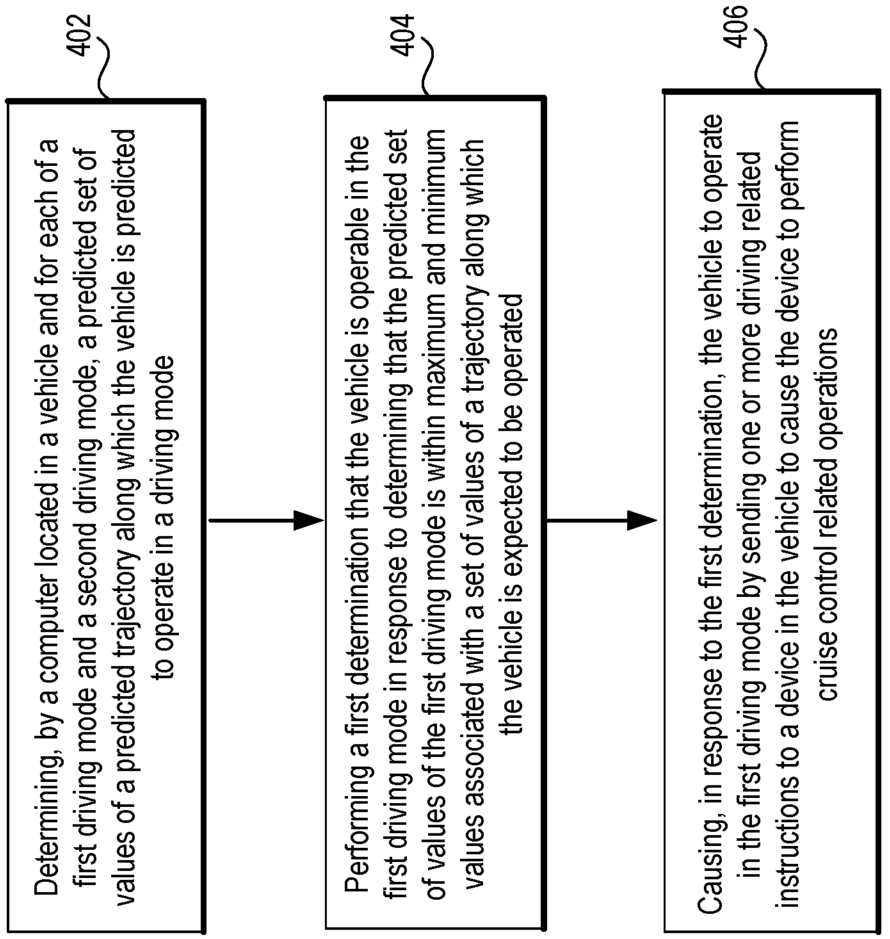
FIG. 4 shows an example flowchart for controlling a driving mode in a vehicle.

FIG. 4 shows an example flowchart for controlling a driving mode in a vehicle. Operation 402 includes determining, by a computer located in a vehicle and for each of a first driving mode and a second driving mode, a predicted set of values of a predicted trajectory along which the vehicle is predicted to operate in a driving mode. Operation 406 includes performing a first determination that the vehicle is operable in the first driving mode in response to determining that the predicted set of values of the first driving mode is within maximum and minimum values associated with a set of values of a trajectory along which the vehicle is expected to be operated. Operation 406 includes causing, in response to the first determination, the vehicle to operate in the first driving mode by sending one or more driving related instructions to a device in the vehicle to cause the device to perform cruise control related operations. The cruise control related operations may include a performance of a transmission, in response to the one or more driving related instructions, of one or more commands by the device to one or more apparatus in the vehicle to operate in accordance with the one or more commands.

In some embodiments, for the first driving mode, a first predicted set of values of a first predicted trajectory includes a first range of predicted speeds and a second range of predicted locations along the first predicted trajectory at a confidence level, and, for the second driving mode, a second predicted set of values of a second predicted trajectory includes a third range of predicted speeds and a fourth range of predicted locations along the second predicted trajectory at the confidence level. In some embodiments, at least some values in the first predicted set of values are greater than or equal to at least some values in the second predicted set of values.

In some embodiments, the method further comprises performing a second determination that the vehicle is not operable in the first driving mode in response to determining that a first predicted set of values of the first driving mode are outside of the maximum and minimum values associated with the set of values of the trajectory along which the vehicle is expected to be operated; performing a third determination that the vehicle is operable in the second driving mode in response to determining that a second predicted set of values of the second driving mode is within the maximum and minimum values associated with the set of values of the trajectory along which the vehicle is expected to be operated; and causing, in response to the third determination, the vehicle to operate in the second driving mode by sending one or more driving related commands to the one or more apparatus in the vehicle, wherein the one or more driving related commands cause the one or more apparatus to operate in accordance with the one or more driving related commands.

In some embodiments, the sending the one or more driving related commands to the one or more apparatus include: sending an engine torque value to an engine of the vehicle, sending a throttle pedal position value to a motor associated with a throttle pedal, sending a brake pressure value to a brake system, sending an engine brake torque value to the engine, and/or sending a brake pedal position value to another motor associated with a brake pedal. In some embodiments, the causing the vehicle to operate in the second driving mode includes sending an instruction that causes the device to be disabled. In some embodiments, after the third determination and before the causing the vehicle to operate in the second driving mode, the method further comprises: determining that the vehicle has not previously switched from the second driving mode to the first driving mode within a pre-determined time window from a time when the third determination is performed, where the vehicle is caused to operate in the second driving mode in response to the third determination and response to the determining that the vehicle has not previously switched from the second driving mode to the first driving mode within the pre-determined time window.

In some embodiments, the set of values of the trajectory includes speeds and locations along the trajectory that includes a future time value. In some embodiments, the one or more driving related instructions sent to the device includes any one or more of: a maximum speed of the vehicle, a minimum speed of the vehicle, a maximum distance between the vehicle and a second vehicle located in front of the vehicle, a minimum distance between the vehicle and the second vehicle located in front of the vehicle, and/or an acceleration, a speed, and/or the minimum distance at one or more points in the trajectory along which the vehicle is expected to be driven. In some embodiments, the one or more apparatus include an engine, a brake system, a first motor associated with a throttle pedal, or a second motor associated with a brake pedal.

In some embodiments, the vehicle is caused to operate in the first driving mode in response to the first determination and in response to a reception of a message from the device that indicates that the device is operable. In some embodiments, for each of the first driving mode and the second driving mode, the predicted set of values of the predicted trajectory is determined based on a confidence value that indicates a likelihood that a value falls within a range of values. In some embodiments, in response to determining that a second predicted set of values of the second driving mode are outside of the maximum and minimum values associated with the set of values of the trajectory along which the vehicle is expected to be operated, the method further comprises: determining that the vehicle is operable in the second driving mode by sending one or more driving related commands to the one or more apparatus in the vehicle, wherein the one or more driving related commands cause the one or more apparatus to operate in accordance with the one or more driving related commands; reducing the confidence value to a second confidence value; determining, for each of the first driving mode and the second driving mode and based on the second confidence value, another predicted set of values of another predicted trajectory along which the vehicle is predicted to operate in the driving mode; causing the vehicle to operate in the first driving mode in response to determining that the another predicted set of values of the first driving mode is within the maximum and minimum values associated with another set of values of another trajectory along which the vehicle is expected to be operated.

In some embodiments, the set of values of the trajectory includes at least some values that are same as the another set of values of the another trajectory. In some embodiments, the sending the one or more driving related commands to the one or more apparatus include sending a brake pedal position value to another motor associated with a brake pedal. In some embodiments, the one or more driving related instructions sent to the device includes, for each of one or more points in the trajectory along which the vehicle is expected to be driven, an acceleration, a speed, and the minimum distance between the vehicle and the second vehicle located in front of the vehicle. In some embodiments, the one or more driving related instructions sent to the device includes a minimum speed of the vehicle. In some embodiments, the one or more driving related instructions sent to the device includes a maximum distance between the vehicle and a second vehicle located in front of the vehicle.

In some embodiments, after the first determination and before the causing the vehicle to operate in the first driving mode, the method further comprises: determining whether a condition associated with operating the vehicle in the first driving mode is satisfied, wherein the causing the vehicle to operate in the first driving mode is performed in response to the first determination and in response to a determination that the condition is satisfied. In some embodiments, the condition for operating the vehicle in the first driving mode is determined to be satisfied in response to determining that a risk level associated with operating the vehicle at a location is same as or less than a pre-determined risk level associated with operating the vehicle in the first driving mode.

In some embodiments, the condition for operating the vehicle in the first driving mode is determined not to be satisfied in response to determining that a risk level associated with an environment where the vehicle is operating is greater than a pre-determined risk level associated with operating the vehicle in the first driving mode, and, in response to determining that the condition is not satisfied, the vehicle is caused to operate in the second driving mode by sending one or more driving related commands to the one or more apparatus in the vehicle, wherein the one or more driving related commands cause the one or more apparatus to operate in accordance with the one or more driving related commands. In some embodiments, the method further comprises determining the risk level of the environment is high by determining that a number of vehicles located around the vehicle is greater than a pre-determined threshold value or by determining that the vehicle is driving towards a traffic intersection comprising a traffic stop slight or a traffic light.

Figure 5:
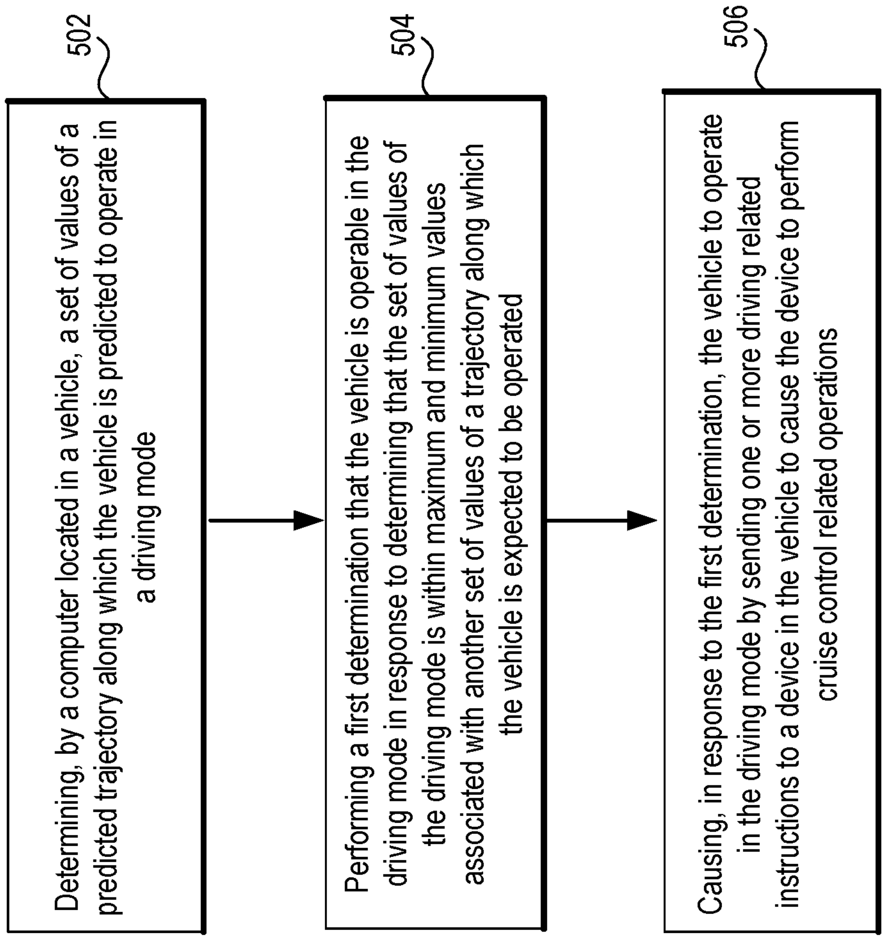
FIG. 5 shows an example flowchart for operating a vehicle in a driving mode.

FIG. 5 shows an example flowchart for operating a vehicle in a driving mode. Operation 502 includes determining, by a computer located in a vehicle, a set of values of a predicted trajectory along which the vehicle is predicted to operate in a driving mode. Operation 504 includes performing a first determination that the vehicle is operable in the driving mode in response to determining that the set of values of the driving mode is within maximum and minimum values associated with another set of values of a trajectory along which the vehicle is expected to be operated. Operation 506 includes causing, in response to the first determination, the vehicle to operate in the driving mode by sending one or more driving related instructions to a device in the vehicle to cause the device to perform cruise control related operations.

In some embodiments, for the driving mode, the set of values of the predicted trajectory includes a first range of predicted speeds and a second range of predicted locations along the predicted trajectory at a confidence level. In some embodiments, the method further comprises performing a second determination that the vehicle is not operable in the driving mode in response to determining that the set of values of the driving mode are outside of the maximum and minimum values associated with the another set of values of the trajectory along which the vehicle is expected to be operated. In some embodiments, the vehicle is caused to operate in the driving mode in response to the first determination and in response to receiving a message from the device that indicates that the device is operable.

In some embodiments, the cruise control related operations include a transmission, in response to the one or more driving related instructions, of one or more commands by the device to one or more apparatus in the vehicle to operate in accordance with the one or more commands. In some embodiments, the one or more apparatus include an engine, a brake system, a first motor associated with a throttle pedal, or a second motor associated with a brake pedal. In some embodiments, the another set of values of the trajectory includes speeds and locations along the trajectory that includes a future time value. In some embodiments, the one or more driving related instructions sent to the device includes a maximum speed of the vehicle. In some embodiments, the one or more driving related instructions sent to the device includes, for each of one or more points in the trajectory along which the vehicle is expected to be driven, an acceleration, a speed, and a minimum distance between the vehicle and a second vehicle located in front of the vehicle.

In some embodiments, the one or more driving related instructions sent to the device includes a minimum speed of the vehicle. In some embodiments, the one or more driving related instructions sent to the device includes a maximum distance between the vehicle and a second vehicle located in front of the vehicle. In some embodiments, the vehicle is caused to operate in the driving mode in response to the first determination and in response to a reception of a message from the device that indicates that the device is operable. In some embodiments, for the driving mode, the set of values of the predicted trajectory is determined based on a confidence value that indicates a likelihood that a value falls within a range of values. In some embodiments, after the first determination and before the causing the vehicle to operate in the driving mode, the method further comprises:

determining whether a condition associated with operating the vehicle in the driving mode is satisfied, wherein the causing the vehicle to operate in the driving mode is performed in response to the first determination and in response to a determination that the condition is satisfied.

In some embodiments, the condition for operating the vehicle in the driving mode is determined to be satisfied in response to determining that a risk level associated with operating the vehicle at a location is same as or less than a pre-determined risk level associated with operating the vehicle in the driving mode. In some embodiments, the condition for operating the vehicle in the driving mode is determined not to be satisfied in response to determining that a risk level associated with an environment where the vehicle is operating is greater than a pre-determined risk level associated with operating the vehicle in the driving mode. In some embodiments, the method further comprises determining the risk level of the environment is high by determining that a number of vehicles located around the vehicle is greater than a pre-determined threshold value or by determining that the vehicle is driving towards a traffic intersection comprising a traffic stop slight or a traffic light. In some embodiments, the one or more driving related instructions sent to the device includes a minimum distance between the vehicle and a second vehicle located in front of the vehicle.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of vehicle operation, comprising:

determining, by a computer located in a vehicle, a plurality of candidate trajectories corresponding to a plurality of driving modes, each candidate trajectory including a set of values of a predicted trajectory along which the vehicle is predicted to operate in a driving mode of the plurality of driving modes;

wherein the plurality of driving modes comprises a first driving mode and a second driving mode;

wherein, in the first driving mode, indirect vehicle control operations are performed in which an adaptive cruise control (ACC) system is enabled and one or more commands is transmitted from the ACC system to one or more apparatus in the vehicle to operate in accordance with the one or more commands; and wherein, in the second driving mode, direct vehicle control operations are performed in which the ACC system is disabled and one or more commands is transmitted from the computer to the one or more apparatus in the vehicle;

performing a first determination that the vehicle is operable in the first driving mode in response to determining that the set of values of the predicted trajectory corresponding to the first driving mode is within maximum and minimum values associated with another set of values of a reference trajectory;

wherein, for each of the plurality of driving modes, the computer performs an operability evaluation based on one or more quantitative metrics associated with a corresponding candidate trajectory, the one or more quantitative metrics comprising at least one of a confidence level, a risk level, or an operational constraint;

comparing operability of the plurality of driving modes based on results of the operability evaluation of the corresponding candidate trajectories;

selecting the first driving mode from the plurality of driving modes based on the comparison; and causing, in response to selecting the first driving mode, the vehicle to operate in the first driving mode by sending one or more driving related instructions to the ACC system in the vehicle to cause the ACC system to perform cruise control related operations.

2. The method of claim 1, wherein, for the first driving mode, the set of values of the predicted trajectory includes a first range of predicted speeds and a second range of predicted locations along the predicted trajectory at the confidence level.

3. The method of claim 1, further comprising:

performing a second determination that the vehicle is not operable in the first driving mode in response to determining that the set of values of the predicted trajectory corresponding to the first driving mode are outside of the maximum and minimum values associated with the another set of values of the reference trajectory;

performing a third determination that the vehicle is operable in the second driving mode in response to determining that a second predicted set of values of the predicted trajectory corresponding to the second driving mode is within the maximum and minimum values associated with the set of values of the reference trajectory; and causing, in response to the third determination, the vehicle to operate in the second driving mode by sending one or more driving related commands to the one or more apparatus in the vehicle.

4. The method of claim 1, wherein the vehicle is caused to operate in the first driving mode in response to the first determination and in response to receiving a message from the ACC system that indicates that the ACC system is operable.

5. The method of claim 1, wherein the cruise control related operations include a transmission, in response to the one or more driving related instructions, of the one or more commands by the ACC system to one or more apparatus in the vehicle to operate in accordance with the one or more commands.

6. The method of claim 1, wherein the one or more apparatus include an engine, a brake system, a first motor associated with a throttle pedal, or a second motor associated with a brake pedal.

7. The method of claim 1, wherein causing the vehicle to operate in the second driving mode includes sending an instruction that causes the ACC system to be disabled.

8. The method of claim 1, wherein the vehicle is caused to operate in the second driving mode in response to a third determination and in response to the determining that the vehicle has not previously switched from the second driving mode to the first driving mode within a pre-determined time window.

9. The method of claim 1, further comprising:

performing an uncertainty propagation prediction for both the first driving mode and the second driving mode to determine, at a confidence level and for each of the two driving modes, a range of values associated with speed and/or location of the vehicle.

10. An apparatus for vehicle operation comprising at least one processor, configured to implement a method, the at least one processor configured to:

determine, by a computer located in a vehicle, a plurality of candidate trajectories corresponding to a plurality of driving modes, each candidate trajectory including a set of values of a predicted trajectory along which the vehicle is predicted to operate in a driving mode of the plurality of driving modes; wherein the plurality of driving modes comprises a first driving mode and a second driving mode; wherein, in the first driving mode, indirect vehicle control operations are performed, in which an adaptive cruise control (ACC) system is enabled and one or more commands is transmitted from the ACC system to one or more apparatus in the vehicle to operate in accordance with the one or more commands; and wherein, in the second driving mode, direct vehicle control operations are performed, in which the ACC system is disabled and one or more commands is transmitted from the computer to the one or more apparatus in the vehicle;

perform a first determination that the vehicle is operable in the first driving mode in response to determining that the set of values of the predicted trajectory corresponding to the first driving mode is within maximum and minimum values associated with another set of values of a reference trajectory; wherein, for each of the plurality of driving modes, the computer performs an operability evaluation based on one or more quantitative metrics associated with a corresponding candidate trajectory, the one or more quantitative metrics comprising at least one of a confidence level, a risk level, or an operational constraint;

compare operability of the plurality of driving modes based on results of the operability evaluation of the corresponding candidate trajectories;

select the first driving mode from the plurality of driving modes based on the comparison; and cause, in response to selecting the first driving mode, the vehicle to operate in the first driving mode by one or more driving related instructions sent to the ACC system in the vehicle to cause the ACC system to perform cruise control related operations.

11. The apparatus of claim 10, wherein the another set of values of the reference trajectory includes speeds and locations along the reference trajectory that includes a future time value.

12. The apparatus of claim 10, wherein the one or more driving related instructions sent to the ACC system includes at least of:

a maximum speed of the vehicle;

a minimum speed of the vehicle; or a maximum distance between the vehicle and a second vehicle located in front of the vehicle.

13. The apparatus of claim 10, wherein the one or more driving related instructions sent to the ACC system includes, for each of one or more points in the trajectory along which the vehicle is expected to be driven, an acceleration, a speed, and a minimum distance between the vehicle and a second vehicle located in front of the vehicle.

14. A non-transitory computer readable program storage medium having code stored thereon, the code, when executed by a processor, causing the processor to implement a method, comprising:

determining, by a computer located in a vehicle, a plurality of candidate trajectories corresponding to a plurality of driving modes, each candidate trajectory including a set of values of a predicted trajectory along which the vehicle is predicted to operate in a driving mode of the plurality of driving modes;

wherein the plurality of driving modes comprises a first driving mode and a second driving mode; wherein, in the first driving mode, indirect vehicle control operations are performed, in which an adaptive cruise control (ACC) system is enabled and one or more commands is transmitted from the ACC system to one or more apparatus in the vehicle to operate in accordance with the one or more commands; and wherein, in the second driving mode, direct vehicle control operations are performed, in which the ACC system is disabled and one or more commands is transmitted from the computer to the one or more apparatus in the vehicle;

performing a first determination that the vehicle is operable in the driving mode in response to determining that the set of values of the predicted trajectory corresponding to the first driving mode is within maximum and minimum values associated with another set of values of a reference trajectory; wherein, for each of the plurality of driving modes, the computer performs an operability evaluation based on one or more quantitative metrics associated with the corresponding candidate trajectory, the one or more quantitative metrics comprising at least one of a confidence level, a risk level, or an operational constraint;

comparing operability of the plurality of driving modes based on results of the operability evaluation of the corresponding candidate trajectories;

selecting the first driving mode from the plurality of driving modes based on the comparison; and causing, in response to selecting the first driving mode, the vehicle to operate in the first driving mode by sending one or more driving related instructions to the ACC system in the vehicle to cause the ACC system to perform cruise control related operations.

15. The non-transitory computer readable program storage medium of claim 14, wherein, for the first driving mode, the set of values of the predicted trajectory is determined based on the confidence level that indicates a likelihood that a value falls within a range of values.

16. The non-transitory computer readable program storage medium of claim 14, wherein after the first determination and before the causing the vehicle to operate in the first driving mode, the method further comprises:

determining whether a condition associated with operating the vehicle in the first driving mode is satisfied, wherein the causing the vehicle to operate in the first driving mode is performed in response to the first determination and in response to a determination that the condition is satisfied.

17. The non-transitory computer readable program storage medium of claim 16, wherein the condition for operating the vehicle in the first driving mode is determined to be satisfied in response to determining that the risk level associated with operating the vehicle at a location is same as or less than a pre-determined risk level associated with operating the vehicle in the first driving mode.

18. The non-transitory computer readable program storage medium of claim 16, wherein the condition for operating the vehicle in the first driving mode is determined not to be satisfied in response to determining that the risk level associated with an environment where the vehicle is operating is greater than a pre-determined risk level associated with operating the vehicle in the first driving mode, the risk level being determined based on environmental factors including surrounding traffic conditions.

19. The non-transitory computer readable program storage medium of claim 18, the method further comprising:

determining the risk level of the environment is high by determining that a number of vehicles located around the vehicle is greater than a pre-determined threshold value or by determining that the vehicle is driving towards a traffic intersection comprising a traffic stop sign or a traffic light.

20. The non-transitory computer readable program storage medium of claim 14, wherein the one or more driving related instructions sent to the ACC system includes a minimum distance between the vehicle and a second vehicle located in front of the vehicle.

* * * * *